E. L. KOON.
KAFIR CORN HEADER.
APPLICATION FILED JAN. 29, 1917.
1,267,559.
Patented May 28, 1918.
2 SHEETS—SHEET 1.
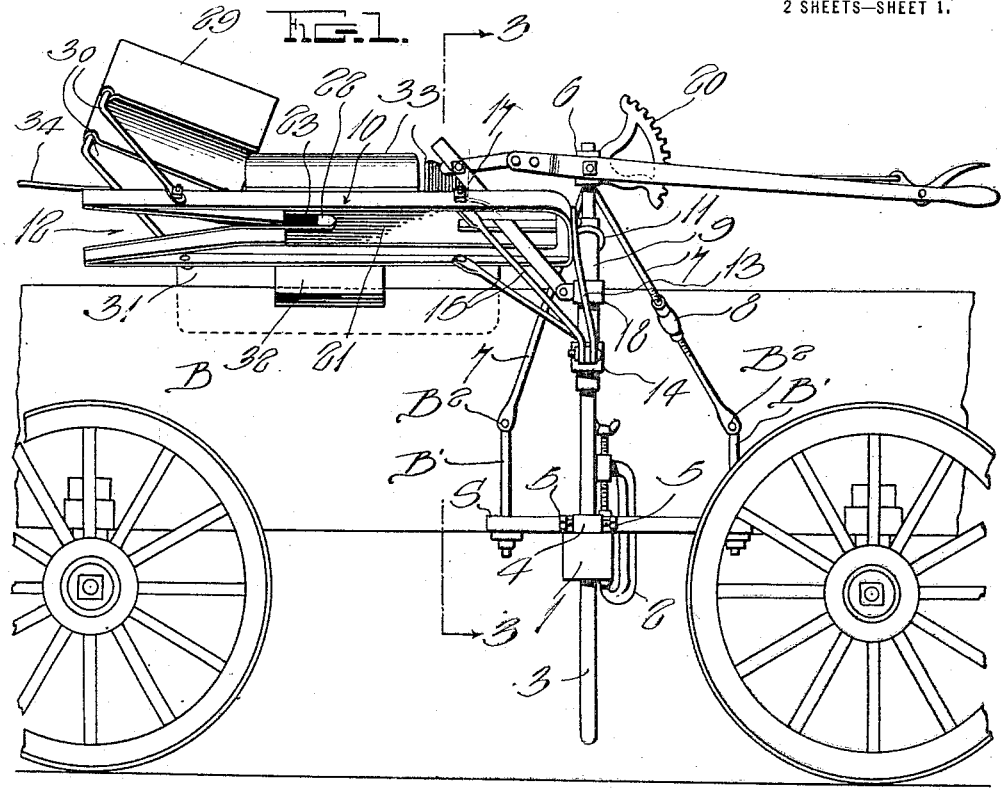
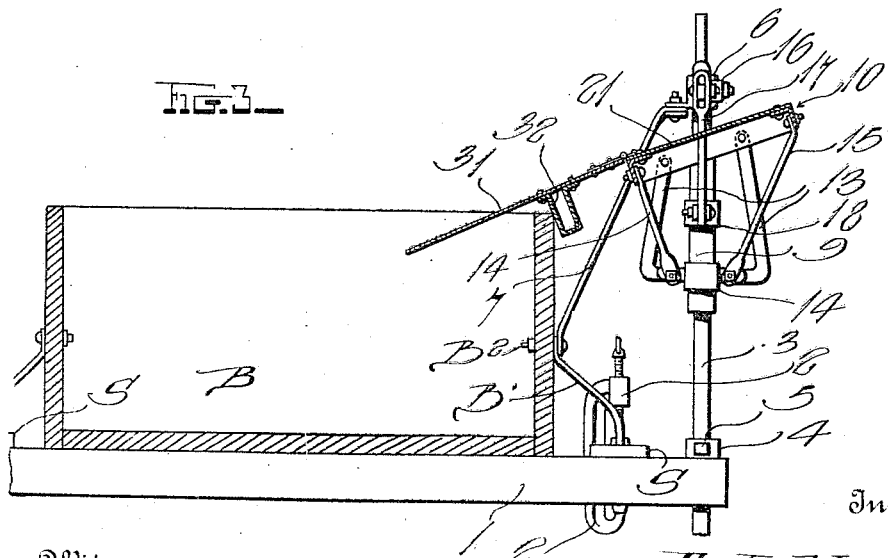
Witness
H. Woodard
Inventor
E. L. Koon
By H. R. Willson &co
Attorneys

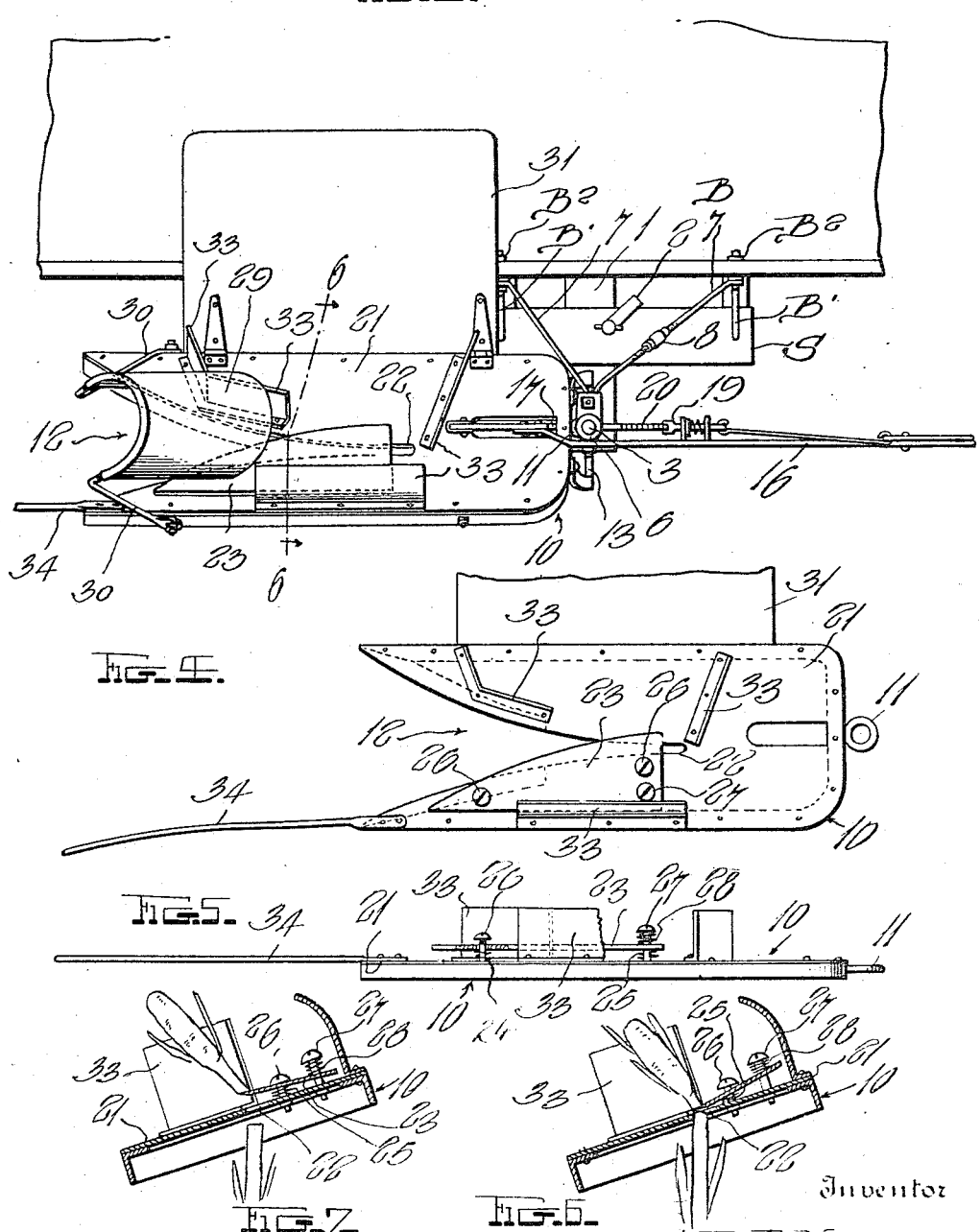

UNITED STATES PATENT OFFICE.

ELMER L. KOON, OF WOODWARD, OKLAHOMA.

KAFIR-CORN HEADER.

1,267,559.

Specification of Letters Patent.

Patented May 28, 1918.

Application filed January 29, 1917. Serial No. 145,227.

*To all whom it may concern:*

Be it known that I, ELMER L. KOON, a citizen of the United States, residing at Woodward, in the county of Woodward and State of Oklahoma, have invented certain new and useful Improvements in Kafir-Corn Headers; and I do declare the following to be a full, clear, and exact description of the invention, such as will enable others skilled in the art to which it appertains to make and use the same.

My invention has for its principal object to provide a comparatively simple yet highly efficient corn heading attachment for farm wagons.

Another object is to provide novel means for adjustably mounting the header upon a vertical standard.

Yet another object is to devise an improved type of knife so constructed and mounted as to cause it to throw the severed heads into the wagon bed.

With the foregoing general objects in view, the invention resides in certain novel features of construction and unique combinations of parts to be hereinafter fully described and claimed, the descriptive matter being supplemented by the accompanying drawings which constitute a part of this application and in which:

Figure 1 is a side elevation of the invention applied to a farm wagon;

Fig. 2 is a plan view of the invention and a portion of the wagon bed;

Fig. 3 is a vertical transverse section on the plane of the line 3—3 of Fig. 1;

Fig. 4 is a top plan view of the main deck and the cutting knife mounted thereon with the corn guiding hood and other parts removed for the sake of clearness;

Fig. 5 is an edge view of Fig. 4 with parts broken away and in section;

Fig. 6 is a vertical transverse section on the plane of the line 6—6 of Fig. 2, showing the knife in the act of cutting the head from one of the stalks;

Fig. 7 is a view similar to Fig. 6, showing the manner in which the knife throws the severed heads toward the wagon bed.

In the drawings above briefly described, B designates the bed of a farm wagon, S the usual steps thereof, B' the braces at the ends of said steps, and $B^2$ the bolts by which said braces are secured to the sides of the bed, these bolts serving in part to attach the present invention to the wagon.

A transverse bar 1 extends beneath the bed B and by means of C-clamps 2 is secured to the step S, one end of said bar having formed therethrough an opening through which a vertical standard 3 passes, said standard having a stop collar 4 resting on the bar 1 and adjustably secured in place by set screws or the like 5. A bracket 6 is rigidly secured on the upper end of the standard 3 and brace rods 7 diverge downwardly from this bracket and are anchored at their lower ends by the bolts $B^2$, the rearmost of said rods preferably having a turnbuckle 8 for taking up lost motion when the device is applied.

A vertical sleeve 9 slidably surrounds the standard 3 below the bracket 6, and an angle metal deck frame 10 is secured at its rear end to the upper end of said sleeve by an eye bolt or the like 11, the front end of the frame 10 being shaped to form an open throat 12. Rear braces 13 depend from the rear end of the frame 10 and are secured to a clamp 14 on the lower end of the sleeve 9 while front braces 15 rise from said clamp and are secured at their upper ends to the sides of said frame. By these means the frame is rigidly connected with the sleeve 9 and when the latter is adjusted vertically on the standard 3, said frame will be correspondingly moved.

For adjusting the sleeve 9 a lever 16 is fulcrumed between its ends to the bracket 6 and the front end of said lever is connected by a link 17 with a collar 18 secured between the ends of said sleeve. The lever 16 is provided with a suitable dog 19 coöperating with a rack 20 which is secured to or formed as an integral part of the bracket 6, whereby said lever may be locked in adjusted position.

A sheet metal deck 21 is riveted at its edges to the deck frame 10 and is formed at its front end with a notch corresponding to the shape of the throat 12, the rear end of said notch terminating in a comparatively narrow slit 22. A horizontally disposed cutting blade 23 is mounted on the deck 21 to one side of the slit 22 and the cutting edge of said blade extends obliquely across this slit as depicted clearly in Figs. 2 and 4. At its pointed front end the blade or knife 23 is supported upon a spring 24 and adjacent the rear end of the cutting edge another spring 25 supports the knife, bolts or the like 26 being passed through the blade, both springs 25, and the deck 21 for retaining the former in place. Another bolt 27 passes through the deck and through the blade 23 at a point spaced a greater distance from the cutting edge of the blade than the bolt which passes through the spring 25, a third coil spring 28 being interposed between the head of said bolt 27 and the upper side of the blade 23 so that the latter normally assumes approximately the position depicted in Fig. 7 but may yield to that shown in Fig. 6.

An arched hood 29 is supported by arms or the like 30 above the throat 12 to bend the tops of the corn stalks downwardly so that the knife 23 can more readily operate thereon, said hood also insuring that only a predetermined amount of the stalk be cut therefrom since it will bend the tall stalks farther down than the comparatively short ones.

An auxiliary deck 31 is hinged to the inner edge of the deck 21 and serves to guide the severed tops into the bed B, said auxiliary deck having a suitable stop 32 to abut the side of said bed to prevent the entire heading attachment from swinging inwardly to too great an extent as will be clear from Figs. 1 and 3, suitable shields 33 being provided for insuring that the severed heads pass from the deck 21 onto the auxiliary deck 31.

Preferably used in conjunction with the parts above described is a downwardly and outwardly curving finger 34 which projects forwardly from the outer edge of the deck 21 to guide the corn stalks into the throat 12.

In operation as the wagon is driven across the field, the throat 12 will receive the numerous rows of corn one at a time, and as the knife comes in contact with the stalks as shown in Fig. 7 and the machine continues to travel, these stalks will exert a downward pull on said knife to compress the springs upon which it is mounted as shown in Fig. 6. Then, as the stalk is cut the head lops over toward the wagon bed and when it is completely severed the springs can expand, thus throwing the severed heads onto the auxiliary deck 31 from which they slide into the wagon bed.

A machine constructed as or substantially as shown and described will be highly efficient and durable yet simple and comparatively inexpensive. For these reasons, the arrangement of parts shown constitutes the preferred form of the header but it is to be understood that within the scope of the invention as claimed, numerous changes may be made without sacrificing the principal advantages.

I claim:

1. A corn heading attachment for farm wagons comprising a standard and means for securing it to the wagon bed, a bracket secured on the upper end of said standard, brace rods depending from said bracket, and means for securing them to the wagon bed, a lever fulcrumed between its ends to said bracket, a rack carried by said bracket for holding the lever in adjusted position, a link depending from the front end of said lever, a vertical sleeve mounted slidably on the standard below the lower end of the link, a deck secured at its rear end to the upper end of said sleeve, rear braces extending from the rear end of said deck to the lower end of the sleeve, front braces inclining upwardly and forwardly from said lower end of the sleeve and secured to the sides of the deck, and a cutter mounted on said deck.

2. A corn header comprising a portable receptacle, a support movable bodily with said receptacle, a knife mounted on said support and adapted to be depressed by engagement with each corn stalk, and means for suddenly raising said knife to its initial position the moment the stalk is cut, whereby to throw the severed head into said receptacle.

3. A corn header comprising a deck having an inlet throat at its front end, a horizontal heading blade extending obliquely across the rear end of said throat and disposed above the deck, front and rear fasteners passing slidably through the blade and connecting the same with the deck, and springs surrounding said fasteners and interposed between the deck and blade to yieldably support the knife above said deck.

4. A corn header comprising a deck having an inlet throat at its front end, a horizontal heading blade above said deck and extending obliquely across the rear end of the throat, a pair of fasteners passing slidably through the blade adjacent the cutting edge thereof and connecting said blade with the deck, a third fastener passing slidably through the blade adjacent the opposite edge thereof, springs surrounding said pair of fasteners and interposed between the deck and blade, and a third spring surrounding said third fastener and exerting its pressure downwardly on said blade.

In testimony whereof I have hereunto set my hand in the presence of two subscribing witnesses.

ELMER L. KOON.

Witnesses:
M. M. MAPELE,
HERBERT KJCKELHALN.